United States Patent [19]
Miekka et al.
[11] Patent Number: 4,918,468
[45] Date of Patent: Apr. 17, 1990

[54] METHOD AND APPARATUS FOR CHARGED PARTICLE GENERATION

[75] Inventors: Fred Miekka, Boxborough; Leo A. Beaudet, Milford, both of Mass.
[73] Assignee: Dennison Manufacturing Company, Framingham, Mass.

[21] Appl. No.: 352,395
[22] Filed: May 15, 1989

Related U.S. Application Data

[63] Continuation-in-part of Ser. No. 270,527, Nov. 21, 1988, abandoned.

[51] Int. Cl.[4] ............ G01D 15/00
[52] U.S. Cl. ............ 346/159; 346/150
[58] Field of Search ............ 346/159, 158, 150, 153.1, 346/139 C, 155; 400/119; 358/300

[56] References Cited

U.S. PATENT DOCUMENTS 3,978,492 8/1976 Simm ............ 346/159

*Primary Examiner*—Arthur G. Evans
*Attorney, Agent, or Firm*—Arthur B. Moore

[57] ABSTRACT

Method and apparatus for charged particle generation, particularly for use in electrographic imaging, in which charged particles are generated in a discharge region and extracted to form an electrostatic image, wherein a controlled gas is introduced into the discharge region for improved operation and service life. The controlled gas may consist of nitrogen, an elemental noble gas (or mixture of such gasses, or a mixture of nitrogen with one or more noble gasses. In the preferred charged particle generator designs, a high voltage alternating potential (drive voltage) is applied between driver and control electrodes separated by a solid dielectric member to induce glow discharges within apertures in the control electrodes. The charged particle generator may include only the driver and control electrodes, or may further include screen electrodes to regulate the extraction of charged particles. Injection controlled gas into the various discharge sites dramatically reduces the threshold voltages for charged particle generation as well as the corrosion and fouling of electrodes and dielectrics, providing a more durable device and improved electrographic print quality. Nitrogen and nitrogen-argon mixtures are preferred, particularly nitrogen-argon mixtures of about 2:1 volume ratio. The controlled gas may be injected at relatively low concentrations with advantageous results, as well as at higher concentrations.

26 Claims, 5 Drawing Sheets

FIG. 3
PRIOR ART
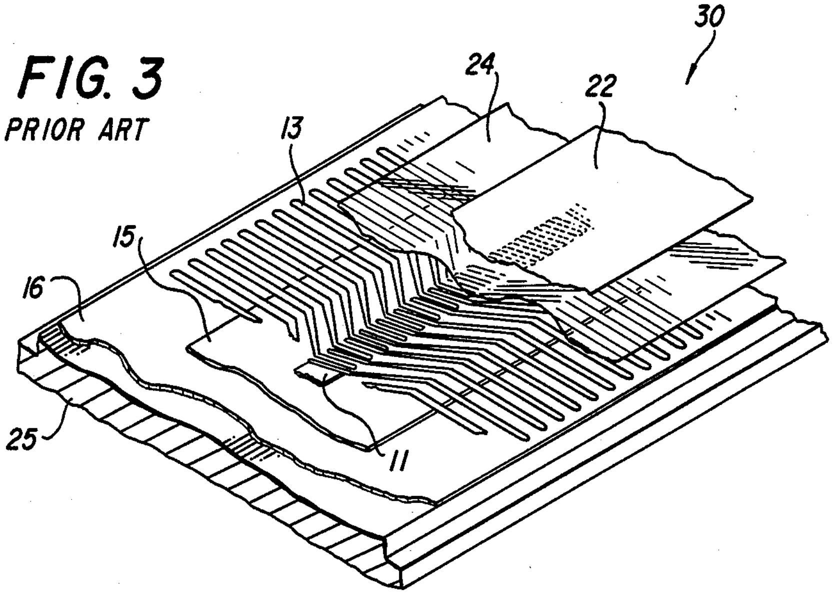
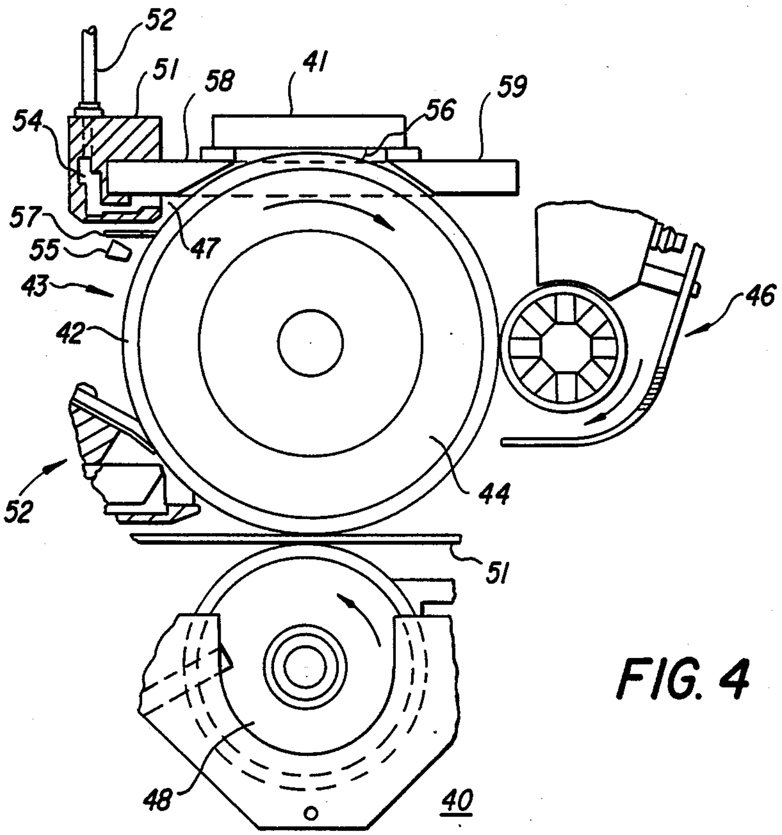
FIG. 4

METHOD AND APPARATUS FOR CHARGED PARTICLE GENERATION

The present application is a continuation-in-part of U.S. patent application Ser. No. 270,527 filed Nov. 21, 1988, now abandoned.

The present invention relates to the generation of charged particles, and more particularly to the generation of charged particles for electrographic imaging.

Charged particles (i.e., as used in the specification and claims of this application, ions and electrons) for use in electrographic imaging can be generated in a wide variety of ways. Common techniques include use of air gap breakdown, corona discharges, and spark discharges. Other techniques employ triboelectricity, radiation (alpha, beta, and gamma as well as x-rays and ultraviolet light), and microwave breakdown. When utilized for the formation of latent electrostatic images, all of the above techniques suffer certain limitations in charged particle output currents and charge image integrity.

A further approach which offers significant advantages in this regard is described in U.S. Pat. No. 4,155,093 and the improvement patent U.S. Pat. No. 4,160,257. These patents disclose method and apparatus for generating charged particles in air involving what the inventors term "glow discharge" or alternatively "silent electric discharge". With reference to the prior art view of FIG. 1, a high voltage alternating potential 10 is applied between two electrodes ("driver" and "control" electrodes 11 and 13) separated by a solid dielectric member 15 (driver electrode 11 is shown with an encapsulating dielectric 16.) As disclosed in U.S. Pat. No. 4,155,093, the alternating potential causes the formation of a pool or plasma **13*p* of positive and negative charged particles in an air region 14 adjacent the dielectric 15 and an edge surface 13*e* of the control electrode 13, which charged particles may be extracted to form a latent electrostatic image. (Note: Inasmuch as electrons as well as ions may be involved in glow discharge electrostatic imaging in certain cases, the more comprehensive term "charged particles" is used herein.) The alternating potential 10 creates a fringing field between the two electrodes and, when the electrical stress on the fringing field region exceeds the dielectric strength of air, a discharge occurs quenching the field. Such silent electric discharge causes a faint blue glow and occurs at a characteristic "inception voltage." Charged particles of a given polarity may be extracted from the plasma 13*p* by applying a bias potential 19 of appropriate polarity between the control electrode 13 and a further electrode 17, thereby attracting such charged particles to a dielectric member 18 to form a latent electrostatic image. In the preferred embodiment, shown in FIG. 1**, negatively charged particles (which have greater mobility) are extracted.

With reference to the prior art view of FIG. 2, U.S. Pat. No. 4,160,257 discloses the use of an additional ("screen") electrode 22, separated from the control electrode 13 by insulating spacer layer 24, to screen the extraction of charged particles, thereby providing an electrostatic lensing action and preventing accidental image erasure. Charged particles are permitted to pass through the screen aperture 26 to the imaging surface 18 when the screen potential 27 assumes a value of the same polarity and lesser magnitude as compared with the control potential or bias 19. The screen potential is limited by the danger of arcing from screen electrode to dielectric member 18.

As seen in the prior art view of FIG. 3, the charged particle generators of the above-discussed patents may be embodied in a multiplexed print head 30, wherein an array of control electrodes 13 contain holes or slots 34 at crossover regions opposite the drive electrodes 11 (sometimes called "RF lines" in view of the use of radio frequency drive voltages) in a matrix arrangement. These structures are shown mounted to an aluminum mounting block 25 which provides structural support for the matrix addressable print cartridge. Driver electrodes are intermittently excited, and any dot in the matrix may be printed by applying a data, or control, pulse to the appropriate control electrode at the time that the appropriate RF line is excited. To achieve full printing it is necessary to drive the RF lines at or above a "critical" voltage (at or above the "inception voltage") i.e., that at which discharges will occur in all holes. It is desirable to minimize the difference between the critical and inception voltages, for improved print uniformity among different dots in the matrix, economy of operation, and other reasons.

In the assignee's current commercial embodiment of the charged particle imaging apparatus discussed above, the solid dielectric member 15 (FIG. 2) comprises a sheet of mica. Mica has been preferred due to its high dielectric strength and other advantageous properties which are needed in the high voltage, ozone discharge environment. The mica sheet is bonded to stainless steel foils using pressure sensitive adhesive (not shown in FIG. 2), and the foils etched in a desired electrode pattern, as disclosed in U.S. Pat. No. 4,381,327. This fabrication provides excellent charged particle output currents over a reasonable service life. Nonetheless, an intensive ongoing effort has been made by the assignee and others to improve the performance and durability of such devices. Various failure mechanisms have been observed, including intrinsic "hard" failure mechanisms (mica dielectric failure, drive line shorting, corona induced insulator failure), intrinsic "soft" failures (steel corrosion, mica surface changes, formation of discharge salts, etching of adhesive bonding control electrode to dielectric) as well as extrinsic failure such as contamination from atmospheric environmental substances and other materials. As example of the latter, observed in the operation of commercial printers in accordance with U.S. Pat. No. 4,267,556, is contamination from fine toner particles.

Accordingly it is a primary object of the invention to provide improved charged particle generation for electrographic imaging. A related object is to achieve an improved method and apparatus which are applicable to glow discharge charged particle generators. Toward these ends, it is desired to improve the operating efficiency and service life of such devices in an economical manner.

SUMMARY OF THE INVENTION

In fulfilling the above and additional objects, the invention provides improved method and apparatus for charged particle generation of the type wherein charged particles are generated at one or more discharge regions using an excitation potential, the improvement comprising supplying to the discharge regions a controlled gas comprising a gas selected from the group consisting of elemental noble gasses, mixtures of elemental noble gasses; nitrogen; and mixtures of nitrogen with noble gasses. The discharge region may contain a relatively low concentration of the controlled gas mixed with ambient air, ranging up to very high concentrations of controlled gas including substantially pure concentrations. Desirably, means are provided for providing a flow of controlled gas to and from the discharge regions during charged particle generation. Advantageously, the charged particles are selectively extracted from the discharge regions for deposition on an imaging member to form latent electrostatic images. In a preferred embodiment, the charged particles are generated by two electrodes on opposite sides of a solid dielectric member. A third electrode may be provided to screen charged particles extracted from the discharge regions.

One aspect of the invention relates to the improvement in electrical operating parameters. In a matrix print head according to the preferred embodiment in which glow discharge is observed in at least one discharge region at an "inception voltage" and occurs in all discharge regions at a "critical voltage", the supply of controlled gas is observed to reduce these threshold voltages. Controlled gas supply also has the effect of reducing the gap between the inception and critical voltages, particularly at higher concentrations.

The presence of controlled gas in the region between the screen electrodes and the imaging member has been observed to increase arcing between these structures, and the controlled gas may be channelled to avoid such arcing. This effect is observed in particular using noble gas, and therefore arcing may be limited by limiting .the amount of noble gas in a nitrogen-noble gas mixture, or using only nitrogen. The ratios of nitrogen to noble gas in a controlled gas mixture may be specified to avoid under arcing while providing desirable reductions in inception voltage and critical voltage--the latter effect improves as the noble gas content increases.

The use of controlled gas is also observed to reduce the incidence of various types of "hard" and "soft" intrinsic failures. In the three-electrode charged particle generator design of the preferred embodiment, supply of controlled gas to the control electrode apertures dramatically reduces corrosion of the dielectric member and of the control and screen electrodes, etching of the bonding adhesive, and deposition of discharge byproducts. Therefore, the risk of corrosion-induced failure of the device is reduced.

The reduction of inception and critical voltages decreases the power requirements of the drive circuitry and likelihood of failure of this circuitry.

The use of controlled gas in the electrographic imaging devices of the preferred embodiment improves print quality, by providing greater uniformity among the various image elements.

Various noble gasses and mixtures of noble gasses may be employed alone or in mixture with nitrogen, but argon is preferred, and helium is an alternative choice. A controlled gas mixture of nitrogen and argon having a ratio of about 2:1 by volume has provided excellent results.

The controlled gas for formulations supplied to the discharge sites need not be pure nitrogen, noble gas, or nitrogen-noble gas mixtures, but may contain air, water vapor, or other ambient or nonambient substance. It is desirable to limit such additional substances to levels which will not substantially mitigate the improvements provided by such controlled gas.

In an operative embodiment of the invention, a baffle structure routes controlled gas through the various discharge regions, possibly in a mixture with ambient air. For example, in the three electrode print head designs of U.S. Pat. No. 4,160,257, controlled gas may be introduced into and extracted from the discharge regions through the screen electrode apertures, or may be routed through ventilation ports in the opposite (driveline side) side of the print head. As an alternative to a baffle structure separate from the print head, the print head itself may be designed with suitable manifold, gas communication ports, etc., to provide a controlled flow of gas to and from the charged particle generation sites.

An alternative electrostatic print head, in accordance with U.S. Pat. No. 4,155,093, omits the screen electrode since such electrode is no longer required to prevent substantial accidental erasure of previously deposited latent electrostatic images.

BRIEF DESCRIPTION OF THE DRAWINGS

The above and additional aspects of the invention are illustrated in the following descriptions of the preferred embodiment, which should be taken together with the drawings in which:

FIG. 3 is a partial perspective view of a prior art matrix print head of the type shown in FIG. 2;

FIG. 4 is a simplified sectional view of a print cartridge in accordance with FIG. 3, placed in proximity to a dielectric cylinder for forming latent electrostatic images, incorporating a baffle arrangement for supply of controlled gas in accordance with the invention;

DETAILED DESCRIPTION

In the prior art charged particle imaging apparatus discussed above, in which the charged particles are generated at a glow discharge site and extracted for deposition on an imaging surface, the charged particles are generated in air. Applicant has found that the introduction of controlled gas into the discharge region dramatically improves the performance and service life of such charged particle imaging apparatus.

Figure 4A:
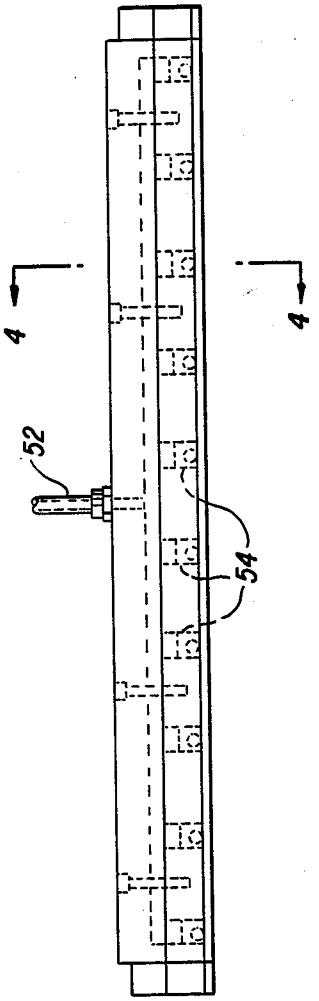
FIG. 4A is a sectional view of the supply manifold from the baffle assembly in FIG. 4, taken in a section along lines 4—4, which is a vertical section parallel to the axis of the imaging cylinder.

FIG. 4 shows, in a partial schematic view, an electrographic printing system 40 incorporating an assembly 50 for routing controlled gas through the various discharge sites of a matrix addressed print head of the type shown in FIG. 3. The various elements of printing system 40 include a print head 41 for depositing charged particles on a dielectric surface layer 42 of imaging cylinder 43 to form a latent electrostatic image; toning station 46 to supply toner particles 47 to the cylinder to create a visible counterpart of the latent electrostatic image; transfer roller 48 in rolling contact with imaging cylinder 43 under high pressure to transfer and simultaneously fuse the toner particles to a receptor sheet 51; scraper blade 52 to remove resilient toner particles; and erase head 55 to erase or reduce any residual charge on the imaging cylinder 43 (many of these structures are only schematically or partially shown in FIG. 4). Such a printing system is disclosed in U.S. Pat. Nos. 4,267,556 and 4,365,549. The assembly 50, along with a source 53 of controlled gas, provides a flow of controlled gas through the discharge sites during ion generation. Print head 41 may be designed with open channels leading to and from the charged particle generation sites in order to reduce the supply rate of noble gas required to achieve desired concentrations of noble gas at the discharge sites. The assembly 50 includes a manifold 51 which receives controlled gas through supply line 52 and routes the gas via a network of conduits (one of which is seen at 54 in FIG. 4) to region 47 adjacent the cylinder 43; mounting supports 58, 59 for print cartridge 41; sealing plates (not shown) at either end of manifold 51 and support 58 to reduce leakage of controlled gas; and a flap 56 which deflects air following the cylinder 43, thereby reducing the volume of air routed to print cartridge 41. As seen in FIG. 4A the manifold 51 includes a network of conduits 54 to evenly distribute controlled gas along the axis of cylinder 43 and print head 41. A barrier 57 between the gas supply assembly 50 and erase device 55 prevents the supply of controlled gas to such erase device.

A variety of controlled gas formulations may be employed. Satisfactory results have been obtained with nitrogen (as further discussed below), which substantially reduces the inception voltage and critical voltage yet avoids arcing between the print cartridge and cylinder and other undesirable electrical discharges. Helium and argon also provide the advantages discussed below at moderate rates of supply and hence economical costs of usage. In fact, the noble gasses provide more substantial reductions of inception and critical voltages than nitrogen alone, but at the risk of undesirable electrical discharges. Best results have been obtained with mixtures of nitrogen and noble gas, which provide greater reductions of inception and critical voltage, more substantial improvements in print quality, etc. than nitrogen alone, without undue risk of arcing. A controlled gas mixture of about 2:1. nitrogen to argon by volume has proven particularly suitable. Surprisingly, quite moderate and economical rates of supply of these controlled gasses to the ion generators are sufficient to achieve marked improvements—see the examples below.

It is generally preferred to provide a positive bias to the electrode for extracting charged particles from the discharge sites (e.g., the conductive core 44 of imaging cylinder 43 in FIG. 4) in order to attract negatively charged particles. Applicant theorizes that the charged particle population extracted from the discharge sites is dominated by electrons, particularly at higher concentrations of noble gas. Applicants have observed that certain substances, e.g. oxygen ($O_2$), carbon dioxide ($CO_2$), and Freon 12 (Freon is a registered trademark of E.I. DuPont de Nemours & Co. for a series of fluorocarbon products), tend to quench the charged particle generating discharges. Applicants theorize that these substances act as electron scavengers. Nitrogen and the noble gasses have unstable electron affinities and applicants theorize that by displacing substances at the discharge sites having more stable electron affinities the supply of controlled gas reduces the voltage requirements for charged particle generation of particular concern in this regard is the ambient oxygen in normal atmospheres. Displacing this oxygen has the further advantage of sharply reducing the formation of ozone which is a corrosive substance and a suspected electron scavenger.

The controlled gas formulations supplied to the discharge sites need not be pure nitrogen, noble gas, or nitrogen-noble gas mixtures, but may contain air, water vapor, or other ambient or nonambient substance. It is desirable to limit such additional substances to levels which do not substantially mitigate the advantages provided by the controlled gas.

Figure 5:
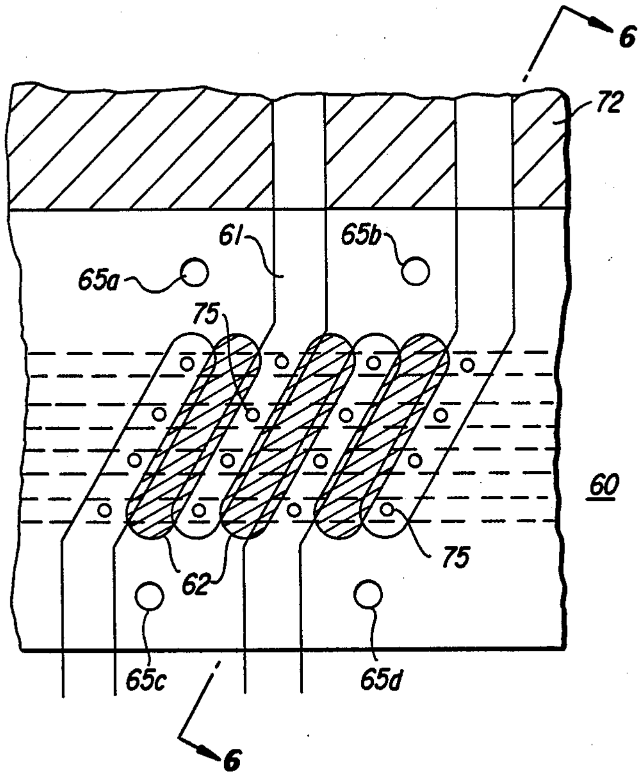
FIG. 5 is a partial plan view of a print cartridge of the type shown in FIGS. 2 and 3, such cartridge including structures for supply of controlled gas, with screen electrodes romoved.
Figure 6:
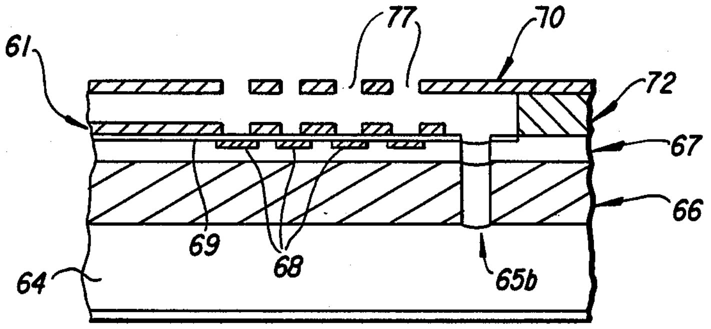
FIG. 6 is a sectional view of a manifold—conduit arrangement for supplying controlled gas to the cartridge of FIG. 5, in a section taken along the lines 6—6 in FIG. 5, with the screen electrodes shown.

As illustrated in the examples below various controlled gas supplies provide worthwhile improvements in print head electrical operating parameters, print quality of images on receptor sheets 51 (uniform dot size and fill), and service life. Best results are provided at high concentrations of controlled gas in the discharge regions, up to and including virtually pure controlled gas. With reference to FIGS. 5 and 6, such high concentrations may be achieved, for example, using a print head 60 designed to route controlled gas to and from the discharge sites at higher-than-ambient pressures. The plan view of FIG. 5 shows a portion of matrix addressable print head 60 of the type disclosed in U.S. Pat. No. 4,160,257. Print head 60 is seen from the screen electrode side with the screen electrode(s) removed to reveal a series of apertured control electrodes or fingers 61 with intervening spacer members 62. The pattern of spacer layer 62 (which defines the channels through which controlled gas flows to and from the various discharge sites) may be designed to allow an even distribution of gas to the discharge sites. Also visible are various gas communication holes *65a–65d*.

FIG. 6 shows a sectional view of the print head 60 in a section taken along the lines 6—6 in FIG. 5, showing the screen electrodes which were omitted from FIG. 5. Controlled gas is supplied under pressure to gas manifold 64, from which it flows to the various discharge sites via the gas communication holes 65 (one seen at **65*b* in FIG. 6). Other structures visible in FIG. 6 include aluminum cartridge block 66, insulator 67 which encapsulates drive lines 68, mica dielectric 69, control electrodes 61, spacer layer 63, and screen electrode 70. (Spacer layer 62 is not visible in this section.) It will be seen that controlled gas flowing under positive gage pressure from manifold 64 through port 65*b* will pass along the control electrode 61 into the various charged particle generation sites at the control electrode apertures 75. Such gas may escape through the screen electrode apertures 77. The inclusion of input ports, manifold, and ducting within a print cartridge structure (as contrasted to a separate baffle structure as shown in FIG. 4**) may reduce the required supply rates of controlled gas required to achieve desired concentrations at the discharge sites.

It is highly desirable, whether using a separate baffle structure or a structure integrated with the print head, to design the system to achieve an even distribution of controlled gas to the various charged particle generation sites. In addition to the use of manifolds, ducting, etc., to distribute the gas, it may be advantageous to provide a crossflow of the controlled gas.

Figure 2:
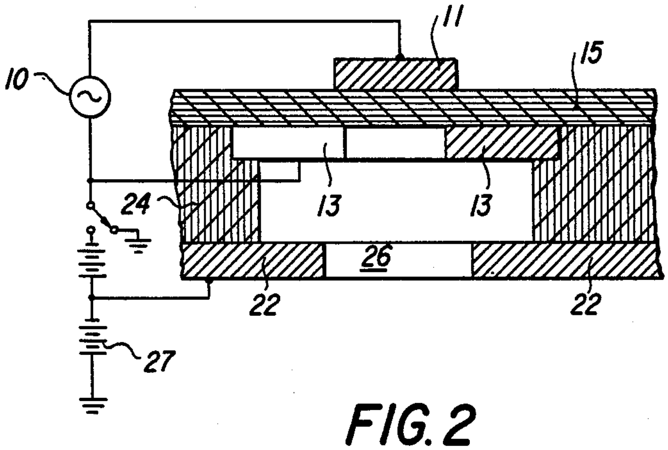
FIG. 2 PRIOR ART
FIG. 2 is a sectional schematic view of a prior art charged particle generator in accordance with U.S. Pat. No. 4,160,257.

The introduction of controlled gas into the charged particle discharge sites in matrix print heads of the type shown in FIGS. 2, 3 is observed to lower the characteristic inception voltage and critical voltage of such devices. See Example 1. In successive tests involving helium and argon, the former gas has been observed to be more efficient in lowering both inception and critical voltages. Tests with each of these gasses evidence continuing reduction of these threshold voltages at increasing concentrations of noble gas. See Example 2, below. The supply of pure nitrogen gas has also been observed to usefully reduce inception and critical voltages (see Example 5), while avoiding screen-to-cylinder arcing and other undesirable electrical discharges discussed below. Mixtures of nitrogen with noble gas can provide greater reductions in the inception and critical voltages as compared with nitrogen alone. See Examples 8,9.

The reduction of these threshold voltages provides a number of advantages. It reduces the power requirements of the drive electronics of the print heads. Furthermore, by decreasing the electrical stresses in the discharge sites, the presence of controlled gas reduces deterioration of the dielectric and electrode structures and bonding adhesive This dramatically decreases the incidence of various hard and soft failure modes, particularly at higher concentrations of controlled gas.

Corrosion of various structures proximate the charged particle generation sites due to chemical influences (nitrogen ions and free radicals produced salts; and other byproducts) is also markedly reduced through the use of controlled gas, most noticeably at higher concentrations. This opens up the range of usable materials for the solid dielectric 15. For example, in lieu of mica one can consider capacitor glasses, and Kapton film (Kapton is a registered trademark of E.J. DuPont DeNemour & Company, Wilmington, Delaware).

With further reference to FIG. 2, in a three-electrode print head based upon U.S. Pat. No. 4,160,257, the introduction of noble gas in the region intermediate the screen electrode 22 and the dielectric imaging member 18 increases the tendency toward arcing between these structures. (Such arcing depends on the potential difference between the screen electrode 22 and counterelectrode 17, as well as the gap width). This effect increases at higher concentrations of noble gas in this region. Undesirable electrical discharges may also occur between other structures of the print cartridge. Because these effects do not present a serious problem using nitrogen alone or nitrogen-noble gas mixtures with a high nitrogen content, these controlled gasses are preferred to argon or helium alone. Excellent results have been obtained with a nitrogen-argon mixture of about 2:1 by volume; see Example 8.

As alluded to above in the discussion of U.S. Pat. Nos. 4,155,093 and 4,160,257 and FIGS. 1-3 hereof, the third, screen electrode of the '257 print heads were found necessary in order to avoid the problem of accidental image erasure. This problem manifested itself in two-electrode print heads as disclosed in the '093 patent through a total or partial erasure of a previously deposited latent electrostatic image. For example, a negative charge image might attract positively charged ions from the print head. Applicant has found that by introducing controlled gas into the discharge sites in a two-electrode device such as that shown in FIG. 1, this problem of image erasure is severely reduced or even eliminated. The omission of the screen electrode will also have other effects, some beneficial and some not: eliminating arcing from the screen electrode to the imaging surface (although there may be a possibility of arcing from the control electrode, depending on the control potential and gap width); and eliminating the electrostatic lensing action of the screen apertures. The latter effect may increase the "blooming" of the charge image, again depending of control potential and gap width. Another major consequence is that without the barriers presented by the screen electrode 22 and spacer layer 24 (FIG. 2), it becomes much easier to supply controlled gas to the control apertures in an arrangement like that shown in FIG. 4.

Another significant advantage of using controlled gas is improved print quality. A common problem in matrix addressable glow discharge print heads of the type shown in FIG. 3 is nonuniformity of discharges among the various charged particle generation sites. This problem tends to worsen at higher differentials between the inception voltage and critical voltage, since at the critical voltage some discharge sites will be driven well above their inception voltage while others will be at or near their inception voltages. Marked improvements in print quality have been observed immediately when supplying new print heads with noble gas, and the use of noble gas reduces the need to raise the drive voltage to reflect increasing critical voltage over the operating life of the print head. In some cases there may be a reduction in stroke width and density of the image due to a lowering of the RF drive potential 10 but these are easily regained through minor adjustments to the control potential 27 or back bias 25 (FIG. 2).

EXAMPLE 1

A printing system as shown in FIG. 4 was equipped with a manifold for introducing argon gas into the ion generation sites of the print cartridge. The system was set up for printing at a web speed of 200 feet per minute. The bias voltage, was turned up until no background image was observed (at 200 volts). The screen voltage was adjusted to a normal potential of approximately 65V per mil gap width. Good printing occurred at a print pulse voltage of 200 volts and at a peak to peak alternating potential of 2600 volts at a frequency of 2.5 MHz. The printing disappeared completely when the alternating potential was reduced to 1,600 volts. Argon was then introduced into the manifold at a flow rate of 4 cubic feet per hour. Printing equivalent in density and with improved uniformity was then observed at the reduced voltage level.

EXAMPLE 2

Figure 7:
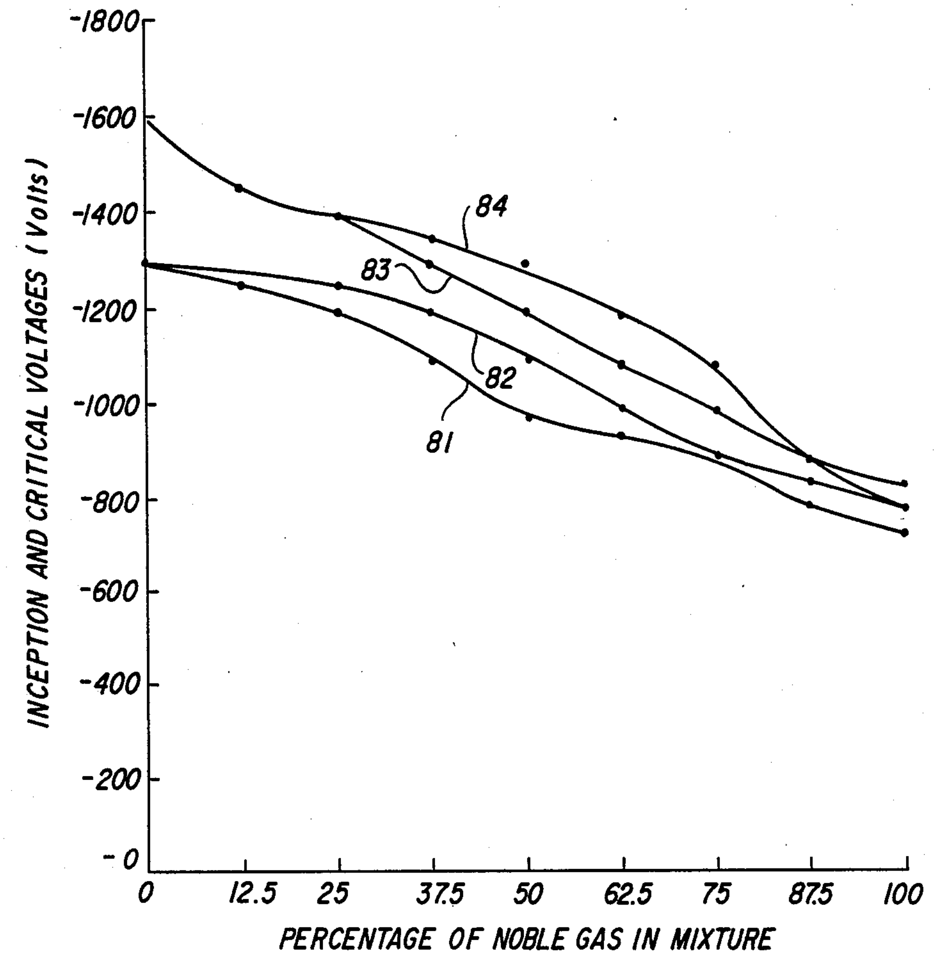
FIG. 7 is a plot of inception voltage and critical voltage for a controlled gas including noble gas without nitrogen as a function of the percentage of noble gas in a mixture with air, supplied to a print cartridge in the tests of Example 1.

A print cartridge designed in accordance with FIGS. 2, 3 was fitted with a baffle and dual gas input ports wherein one port received air at a controlled rate of flow, and the other received noble gas. The supply rates of air and noble gas were maintained at complementary values totalling four cubic feet per hour. Inception and critical voltages were measured at various ratios of argon to air, and the experiment was then repeated with helium. The measured threshold voltages are plotted in FIG. 7, wherein curve 81 shows the inception voltage for helium, curve 82 the inception voltage for argon, curve 83 the critical voltage for helium, and curve 84 the critical voltage for argon. Helium was generally more efficient than argon in lowering the critical voltage and threshold voltage, particularly at noble gas concentrations between 25% and 75% by volume. The critical and inception voltages approached each other at very high concentrations of noble gas, for both helium and argon.

EXAMPLE 3

The electrographic printer of FIG. 4 was equipped with a simple manifold consisting of a metal tube plugged at both ends with an argon gas input port in the middle, and a series of holes along the length of the tube. The AC voltage to the RF lines was set at 1400 volts, and a back bias between the screen electrode and control electrodes was set at 150 volts. The screen voltage and speed of a web of receptor paper were varied, and at each pair of values the inflow rate of argon was increased until arcing from the screen electrode to the imaging cylinder was observed. (Higher web speeds require higher output currents from the print head.) The procedure was then repeated with helium. Tables 1 and 2 set forth the maximum flow rates of noble gas without• screen-to-cylinder arcing measured as described above. It appeared from these tests that screen-to-cylinder arcing is not as serious a problem with argon as it is with helium.

EXAMPLE 4

The electrographic printer of FIG. 4 was equipped with a manifold as shown in FIGS. 4 and 4A to displace ambient air and supply controlled gasses to the print cartridge. Two baffles 56 were employed to reduce controlled gas flow rates to the print cartridge to 15 cubic feed per hour. The printhead produced a standard image of 300 dots per inch, and the web speed rate of receptor web 51 was 100 feet per minute. A plastic blade was taped beneath the manifold in contact with the dielectric cylinder 43 to reduce the stream of ambient air that followed the cylinder to the print cartridge.

Pure nitrogen was supplied through line 52 at various flow rates, and measurements made of the inception and critical voltages—see Table 3. From this it appeared that increasing the supply rate of nitrogen lowered both the inception and critical voltages up to a point, but that at flow rates above 20-25 CFH some increase in these voltages was observed. It is theorized that this increase at high flow rates was attributable to a drop in temperature of the print head. A temperature probe attached to the print head revealed at least a 4-5 degree F drop in temperture at the highest flow rate.

TABLE 1

Maximum flow rate of noble gas without screen-to-cylinder arcing, at various values of screen voltage and web speed, measured as described in Example 3, for argon:

| Screen Voltage (volts) | Web Speed (feet/minute) | Maximum Flow Rate (cubic ft. feet per hour) |
|---|---|---|
| 600 | 100 | 10 |
| 600 | 200 | 20 |
| 600 | 300 | 25 |
| 600 | 400 | 37 |
| 500 | 100 | 20 |
| 500 | 200 | 35 |
| 500 | 300 | 40 |
| 500 | 400 | over 50 |
| 400 | 100 | 35 |

TABLE 1-continued

Maximum flow rate of noble gas without screen-to-cylinder arcing, at various values of screen voltage and web speed, measured as described in Example 3, for argon:

| Screen Voltage (volts) | Web Speed (feet/minute) | Maximum Flow Rate (cubic ft. feet per hour) |
|---|---|---|
| 400 | 200 | over 50 |

TABLE 2

Maximum flow rate of noble gas without screen-to-cylinder arcing, at various values of screen voltage and web speed, measured as described in Example 3, for helium:

| Screen Voltage (volts) | Web Speed (feet/minute) | Maximum Flow Rate (cubic ft. ft. per hour) |
|---|---|---|
| 600 | 100 | 5 |
| 600 | 200 | 10 |
| 600 | 300 | 15 |
| 600 | 400 | 20 |
| 500 | 100 | 10 |
| 500 | 200 | 15 |
| 500 | 300 | 25 |
| 500 | 400 | 30 |

EXAMPLE 5

The printing apparatus of Example 5 was set up for a life test of the print cartridge with a controlled gas of pure nitrogen supplied at five cubic feet per hour (5 CFH) with no nitrogen supplied. The initial inception voltage was measured at 1200 volts, and the initial critical voltage at 1800 volts. The initial inception voltage under nitrogen was 1000 v, and the initial critical voltage was 1300 v. The RF drive voltage was maintained at 1600 v. for a life test of 19.5 hours After 19.5 hours the manifold seals were removed. The inception voltage in air was measured at 1000 V, and the critical voltage in air was 1600 V—both 200 V lower than the initial measurements in air. There were almost no signs of etching of the control fingers, and the dielectric was slightly etched. There was a slight buildup of discharge byproducts on the back of the screen electrodes.

EXAMPLE 6

A print cartridge designed in accordance with FIGS. 2, 3 was fitted with a baffle and dual gas input ports wherein one port received air at a controlled rate of flow, and the other received noble gas. The supply rates of air and noble gas were maintained at complementary values totalling ten cubic feet per hour. The percentage of nitrogen mixed with air in the gas supplied to the present head was varied from 0% to 100%. Measurements of inception voltage and critical voltage for the various nitrogen-air mixtures are given in Table 4. The critical voltage was first affected at 50% nitrogen, inception voltage first affected at 70% nitrogen, and best results obtained at 100% nitrogen.

EXAMPLE 7

The print cartridge of Example 6 was life tested for 17.25 hours at 100% nitrogen. The drive voltage was maintained at 1600 V, 300 volts above the initial critical voltage. After 17.25 hours the manifold and nitrogen supply were removed.

TABLE 3

| Inception and Critical Voltages Measured with the Printer Apparatus of Example 4, at various supply rates of Pure Nitrogen | | |
|---|---|---|
| Supply Rate (Cubic Feet per Hour) | Inception Voltage (Volts) | Critical Voltage (Volts) |
| 0 | 1500 | 2200 |
| 5 | 1400 | 2500 |
| 10 | 1350 | 1900 |
| 15 | 1350 | 1600 |
| 20 | 1300 | 1500 |
| 25 | 1300 | 1500 |
| 35 | 1300 | 1600 |
| 50 | 1700 | 1700 |

TABLE 4

| Inception and Critical Voltages for various mixtures of nitrogen and air supplied to the print head at 10 cubic feet per hour (Example 6) | | | |
|---|---|---|---|
| Percent Nitrogen | Percent Air | Inception Voltage (V) | Critical Voltage (V) |
| 0 | 100 | 1200 | 1700 |
| 10 | 90 | 1200 | 1700 |
| 20 | 80 | 1200 | 1700 |
| 30 | 70 | 1200 | 1700 |
| 40 | 60 | 1200 | 1700 |
| 50 | 50 | 1200 | 1650 |
| 60 | 40 | 1200 | 1650 |
| 70 | 30 | 1150 | 1600 |
| 80 | 20 | 1150 | 1550 |
| 90 | 10 | 1150 | 1500 |
| 100 | 0 | 1100 | 1300 |

The side of the printhead life tested under nitrogen had an inception voltage of 1000 V (100 V below the initial value) and critical voltage of 1250 V. (50 V below the critical value). The printhead half tested in ambient air had a final inception voltage of 1500 V (300 V higher than the initial value) and critical voltage of 1900 V (400 V higher than the critical value). The mica dielectric of the printhead half tested in air evidenced considerably more corrosion and byproduct buildup than that tested in nitrogen.

EXAMPLE 8

The printer of Example 4 was operated at 240 feet per minute web speed, a control voltage of 150 V, back bias 250 V, screen voltage 1024 V, and RF drive voltage of 1600 V. While supplying pure nitrogen to the printhead, print samples were obtained at flow rates of 10 CFH, 20 CFH, 30 CFH, 40 CFH, 50 CFH and 60 CFH. Almost no printing occurred at 10 CFH, partial printing occurred at 20 CFH, and excellent print quality was seen at 30 CFH and higher. Then, 10 CFH of nitrogen was mixed with successively greater volumes of argon starting with 1 CFH, at 1 CFH increments. These tests of varying nitrogen-argon mixtures were repeated with nitrogen flow rates of 20 CFH and 30 CFH respectively. A ratio of about 2:1 nitrogen to argon was seen to fully regain and somewhat improve image density and stroke size, with best results at about 20 CFH nitrogen and 10 CFH argon. Under these conditions, no arcing was encountered either with the printer running or stopped. Higher ratios of argon to nitrogen broadened strokes to the point of making power supply adjustments (control and back bias voltages) difficult. Arcing was observed at ratios of 2:1 and higher of argon to nitrogen.

EXAMPLE 9

The printer of example 4 was supplied with various controlled gasses to measure inception voltage and critical voltage. Running in ambient air, the inception voltage was 1500 V and the critical voltage 2400 V. When supplying pure nitrogen, the inception voltage was 1200 V and the critical voltage 1500 V. When supplying a 2:1 mixture of nitrogen and argon by volume, the inception voltage was 1150 V and the critical voltage 1350 V.

Figure 1:
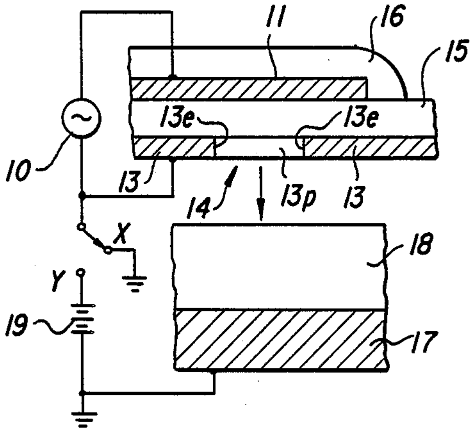
FIG. 1 PRIOR ART
FIG. 1 is a sectional schematic view of a prior art charged particle generator in accordance with U.S. Pat. No. 4,155,093.

Although the method and apparatus of the present invention has been illustrated in context of the prior art glow discharge electrographic print devices of FIGS. 1-3, the invention admits of numerous variations in the nature of the electrographic apparatus and process to which it is applied. For example, the invention may be used with other print devices such as those disclosed in U.S. Pat. Nos. 4,675,703, 4,558,334 and 4,490,604; and U.S. Pat. No. 4,426,654 (ion modulating electrode with multiple layers and through apertures); 4,425,054 (ion modulating electrodes with separate corona ion source); and Japanese Laid-open Patent Publication Sho 61-112658 (glow discharge print device forming ions between side-by-side "discharge electrodes"); or the pin plotter or printer devices of U.S. Pat. Nos. 3,662,396; 3,711,859; and 3,958,251. In the latter devices, an array of pins is located in close proximity (on the order of 0.1-0.25 mils) to a dielectric image receptor member, and a pulse is applied between the pin electrode and a backing electrode. The introduction of controlled gas in the discharge region reduces the required potential of the excitation pulse, and provides other advantages.

We claim:

1. An improved method of generating charged particles for electrostatic imaging which comprises:

applying an alternating potential between a first electrode substantially in contact with one side of a solid dielectric member and a second electrode substantially in contact with an opposite side of the solid dielectric member, said second electrode having an edge surface disposed opposite said first electrode to define a discharge region at the junction of the edge surface and the solid dielectric member, to induce charged particle producing electrical discharges in said air region between said solid dielectric member and the edge surface of said electrode;

applying a charged particle extraction potential between said second electrode and a further electrode member to extract charged particles produced by the electrical discharges in said air region; and applying the external charged particles to a further member to form an electrostatic image, wherein the improvement comprises supplying a controlled gas to the discharge site to displace at least some of the air during charged particle generation, said controlled gas being selected from the group consisting of nitrogen, elemental noble gasses, mixtures of elemental noble gasses, and mixtures of nitrogen with one or more elemental noble gasses.

2. The method of claim 1 wherein the controlled gas is selected from the group connecting of nitrogen and mixtures of nitrogen and argon.

3. The method of claim 2 wherein the controlled gas consists of a nitrogen-argon mixture of about 2:1 by volume.

4. The method of claim 1 wherein the controlled gas consists of a noble gas selected from the group argon and helium.

5. The method of claim 1 wherein the supplying step comprises creating a flow of the controlled gas into and out of the discharge sites.

6. Improved apparatus for generating charged particles for electrostatic imaging which comprises;

a solid dielectric member;

a first electrode substantially in contact with one side of said solid dielectric member;

a second electrode substantially in contact with an opposite side of said solid dielectric member, with an edge surface of said second electrode disposed opposite said first electrode to define a discharge region at the junction of said edge surface and said solid dielectric member;

means for applying an alternating potential between said first and second electrodes of sufficient magnitude to induce charged particle producing electrical discharges in said discharge region between the dielectric member and the edge surface of said second electrode; and means for applying a charged particle extraction potential between said second electrode and a further electrode, wherein the improvement comprises means for supplying controlled gas to the discharge site to displace at least some of the air at said discharge site during the generation of charged particles, said controlled gas comprising a gas selected from the group consisting of nitrogen, elemental noble gasses, mixtures of elemental noble gasses, and mixtures of nitrogen with one or more elemental noble gasses.

7. Improved apparatus for generating electrostatic images of the type including a solid dielectric member; a "driver" electrode substantially in contact with one side of the solid dielectric member; a "control" electrode substantially in contact with an opposite side of the solid dielectric member, with an edge surface of said control electrode disposed opposite said driver electrode to define a discharge site at the junction of said edge surface and said solid dielectric member; means for applying an alternating potential between said driver and control electrode of sufficient magnitude to induce charged particle producing electrical discharges in said discharge site between the solid dielectric member and the edge surface of the control electrode; means for applying a charged particle extraction potential $V_c$ between the control electrode and a further electrode member to extract ions produced by the electrical discharges in said air region and apply these charged particles to a dielectric surface to form an electrostatic image thereon; a third ("screen") electrode; a solid dielectric layer separating said screen electrode from the control electrode and the solid dielectric member; and a source of "screen" voltage $V_s$ between the screen electrode and the further electrode member, wherein $V_s$ has a magnitude greater than or equal to zero and the same polarity as $V_c$;

wherein the improvement comprises means for supplying a controlled gas to the discharge site to displace at least some of the air during charged particle generation, said controlled gas comprising a gas selected from the group consisting of nitrogen, elemental noble gasses, mixtures of elemental noble gasses, and mixtures of nitrogen with one or more elemental noble gasses.

8. The method of claim 1 of the type in which a multiplicity of driver and control electrodes form cross points in a matrix array configured such that the control electrodes contain openings at matrix electrode crossover regions, wherein the controlled gas is supplied to said openings.

9. Apparatus as defined in claim 6 of the type in which a multiplicity of driver and control electrodes form cross points in a matrix array configured such that the control electrodes contain openings at matrix electrode crossover regions, wherein the supplying means supplies the controlled gas to said openings.

10. The method of claim 1 further comprising the step of limiting the volume of ambient air supplied to the discharge site in a mixture with said controlled gas.

11. The method of claim 1 wherein the supplying step comprises supplying controlled gas to said discharge site at higher than ambient pressure.

12. Apparatus as defined in claim 7 of the type in which a multiplicity of driver and control electrodes form cross points in a matrix array configured such that the control electrodes contain openings at matrix crossover regions, wherein said solid dielectric layer contains apertures corresponding to said openings, and said screen electrode comprises a conducting member containing a series of apertures corresponding to said openings, wherein the supplying means supplies controlled gas to the openings in said control electrode.

13. The method of claim 1 further comprising the step of controlling the extraction of charged particles using a screen electrode intermediate the discharge site and solid dielectric member.

14. The method of claim 13 wherein the supply of controlled gas to the discharge site is limited to avoid arcing between the screen electrode and the dielectric imaging member.

15. The method of claim 13 wherein the controlled gas composition is selected to avoid undue arcing between the screen electrode and dielectric imaging member.

16. The method of claim 1 wherein the controlled gas composition is selected to avoid undesirable electrical discharges.

17. Apparatus as defined in claim 6 wherein the controlled gas is selected from the group consisting of nitrogen and mixture of nitrogen and argon.

18. Apparatus as defined in claim 17 wherein the controlled gas is comprised of a nitrogen-argon mixture in a ratio about 2:1 by volume.

19. Apparatus as defined in claim 6 wherein the controlled gas is selected from the group helium and argon.

20. Apparatus as defined in claim 6 wherein the supplying means creates a flow of said controlled gas to and from the discharge region.

21. Apparatus as defined in claim 6 further comprising a screen electrode intermediate the control electrode and further electrode member, for controlling the extraction of charged particles.

22. Apparatus as defined in claim 6, including a plurality of discharge sites, wherein the supplying means include means for distributing controlled gas to said discharge sites in a substantially uniform distribution.

23. Apparatus as defined in claim 6, further comprising means for reducing the volume of ambient air supplied to the discharge site in a mixture with the controlled gas.

24. Apparatus as defined in claim 6, further comprising means for substantially eliminating the ambient air supplied to the discharge site with the controlled gas.

25. Apparatus as defined in claim 7 wherein the controlled gas is selected from the group consisting of nitrogen and mixtures of nitrogen and argon.

26. Apparatus as defined in claim 25 wherein the controlled gas is comprised of a nitrogen-argon mixture of about 2:1 ratio by volume.

* * * * *